US010311615B2

United States Patent
Ko et al.

(10) Patent No.: US 10,311,615 B2
(45) Date of Patent: Jun. 4, 2019

(54) METHOD AND DEVICE FOR PROVIDING AUGMENTED REALITY IMAGE AND RECORDING MEDIUM STORING PROGRAM TO EXECUTE THE METHOD

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Jae-woo Ko, Uiwang-si (KR); Byoung-ho Lee, Seoul (KR); Byung-hyo Lee, Seoul (KR); Ki-seung Bang, Seoul (KR); Chang-won Jang, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/622,723

(22) Filed: Jun. 14, 2017

(65) Prior Publication Data

US 2018/0089871 A1    Mar. 29, 2018

(30) Foreign Application Priority Data

Sep. 27, 2016    (KR) .................. 10-2016-0124240

(51) Int. Cl.
*G06T 19/00* (2011.01)
*G06T 5/00* (2006.01)
*G02B 27/01* (2006.01)
*G02B 27/28* (2006.01)
*H04N 13/337* (2018.01)
*H04N 13/341* (2018.01)
(Continued)

(52) U.S. Cl.
CPC .......... *G06T 11/60* (2013.01); *G02B 27/0172* (2013.01); *G02B 27/281* (2013.01); *G06T 5/003* (2013.01); *G06T 5/009* (2013.01); *G06T 5/20* (2013.01); *G06T 2207/20208* (2013.01)

(58) Field of Classification Search
CPC ......... G06T 19/006; G06T 19/00; G06T 5/00; G06T 5/003; G06T 7/70; G02B 26/00; G02B 27/00; G02B 5/00
See application file for complete search history.

(56) References Cited

U.S. PATENT DOCUMENTS 8,890,943 B2 * 11/2014  Lee .................. G02B 27/26
                                                  348/56
8,941,559 B2    1/2015  Bar-Zeev et al.
9,858,721 B2 *  1/2018  Maimone .............. G06T 19/006
(Continued)

*Primary Examiner* — Ke Xiao
*Assistant Examiner* — Andrew Shin
(74) *Attorney, Agent, or Firm* — Sughrue Mion, PLLC

(57) ABSTRACT

A device and method for providing an augmented reality (AR) image are provided. The device includes a display configured to alternately display a first image including an object at an object position and a second image including a mask for blocking transmission of light incident on the display at the object position; a processor configured to determine a time period and control the display to alternately display the first image and the second image during the time period; and a polarization switch configured alternately polarize the light incident on the display at a switching period determined based on the time period.

13 Claims, 8 Drawing Sheets

(51) Int. Cl.
*G06T 11/60* (2006.01)
*G06T 5/20* (2006.01)

(56) References Cited

U.S. PATENT DOCUMENTS

2015/0234508 A1* 8/2015 Cho ................... G06F 3/0412
345/173
2017/0154464 A1* 6/2017 Lanier .................. G06T 19/006

* cited by examiner

METHOD AND DEVICE FOR PROVIDING AUGMENTED REALITY IMAGE AND RECORDING MEDIUM STORING PROGRAM TO EXECUTE THE METHOD

CROSS-REFERENCE TO RELATED APPLICATION

This application claims priority from Korean Patent Application No. 10-2016-0124240, filed on Sep. 27, 2016, in the Korean Intellectual Property Office, the disclosure of which is incorporated herein by reference in its entirety.

BACKGROUND

1. Field

Methods and apparatuses consistent with exemplary embodiments relate to a method of providing an augmented reality (AR) image, a device for providing an AR image, and a recording medium storing a program for executing the method of providing an AR image.

2. Related Art

AR technology may be used to synthesize virtual objects or information with a real environment. This allows a user to view the virtual objects or information to as existing in the real environment. The AR technology may be applied to various applications including military, aviation, medicine, video games, entertainment, sports, etc.

As interest in the AR technology increases, various technologies for realizing AR are being actively developed. In particular, in order to improve immersion of virtual objects or information seen in AR, research is being actively conducted into technology for occluding an area corresponding to a virtual image portion of real information seen in AR.

SUMMARY

One or more exemplary embodiments provide a method and device for providing an augmented reality (AR) image and a recording medium storing a program for executing the method, which selectively transmit, through a display, polarized light in a specific direction, the polarized light being of external light incident on the device, thereby preventing a phenomenon where virtual-world information appears to have added real-world light.

One or more exemplary embodiments provide a method and device for providing an AR image and a recording medium storing a program for executing the method, which reduce a blur phenomenon of a mask used for blocking real-world light in the device.

Additional aspects will be set forth in part in the description which follows and, in part, will be apparent from the description, or may be learned by practice of the presented embodiments.

According to an aspect of an exemplary embodiment, there is provided a device for providing an augmented reality (AR) image, the device including: a display configured to alternately display a first image including an object at an object position and a second image including a mask for blocking transmission of light incident on the display at the object position; a processor configured to determine a time period and control the display to alternately display the first image and the second image during the time period; and a polarization switch configured alternately polarize the light incident on the display at a switching period determined based on the time period.

The processor may be further configured to synchronize a switching period of the polarization switch arranged in one direction of the display to change the direction of the polarized light, with the determined time period.

The device may further include a first polarizer disposed on a first surface of the display and configured to block light in a first axial direction, and the polarization switch may be further configured to change a polarization direction to the first axial direction while the first image is displayed, and change the polarization direction to a second axial direction while the second image is displayed.

The processor may be further configured to predict blur values of pixels corresponding to the mask of the second image based on a distance between the display and a user of the device, a pupil size of the user, and a focal distance of the device; perform preprocessing on the second image to offset a blur effect; and generate a corrected second image based on the predicted blur values.

The processor may be further configured to perform deconvolution on the second image by using the predicted blur values and update values of pixels of a second image obtained through the deconvolution based on a contrast between the values of the pixels included in the second image.

The processor may be further configured to perform the deconvolution on a second image obtained through the updating by using the predicted blur values, and the deconvolution and the updating may be repeatedly performed a predetermined number of times.

The device may further include: a sensor configured to sense an eye-gaze of a user of the device, and the processor may be further configured to determine the position of the object of the first image based on the sensed eye-gaze.

According to an aspect of another exemplary embodiment, there is provided a method of providing, by a device, an augmented reality (AR) image, the method including: obtaining a first image including an object at an object position and a second image including a mask for blocking transmission of light incident on the display at the object position; determining a time period; controlling a display to alternately display the first image and the second image during the time period; and alternately polarizing light incident on the display at a switching period determined based on the determined time period.

The changing of the direction of the polarized light may include synchronizing a switching period of a polarization switch arranged in one direction of the display to change the direction of the polarized light, with the determined time period.

The alternately polarizing the light incident on the display may include: changing a polarization direction to a first axial direction while the first image is displayed; and changing a polarization direction to a second axial direction while the second image is displayed. The light incident on the display may be blocked while the first image is displayed by a polarizer which blocks light in the second axial direction and is disposed on one surface of the display, and the light incident on the display may be irradiated onto the display through the polarizer which blocks light in the second axial direction while the second image is displayed.

The may further include: predicting blur values of pixels corresponding to the mask of the second image based on a distance between the display and a user of the device, a pupil size of the user, and a focal distance of the device; performing preprocessing on the second image to offset a blur effect of the second image based on the predicted blur values; and generating a corrected second image based on the predicted blur values.

The generating of the corrected second image may include: performing deconvolution on the second image by using the predicted blur values; and updating values of pixels of a second image obtained through the deconvolution based on a contrast between the values of the pixels included in the second image.

The generating of the corrected second image may include performing the deconvolution on a second image obtained through the updating by using the predicted blur values, and repeatedly performing the deconvolution and the updating a predetermined number of times.

The method may further include sensing an eye-gaze of a user of the device; and determining the position of the object of the first image, based on the sensed eye-gaze.

According to an aspect of yet another exemplary embodiment, there is provided a non-transitory computer-readable recording medium storing a program, which when executed by a processor of an augmented reality (AR) device, causes the AR device to perform an AR method, the method including: obtaining a first image including an object at an object position and a second image including a mask for blocking transmission of light incident on the display at the object position; determining a time period; controlling a display to alternately display the first image and the second image during the time period; and alternately polarizing light incident on the display at a switching period determined based on the determined time period.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
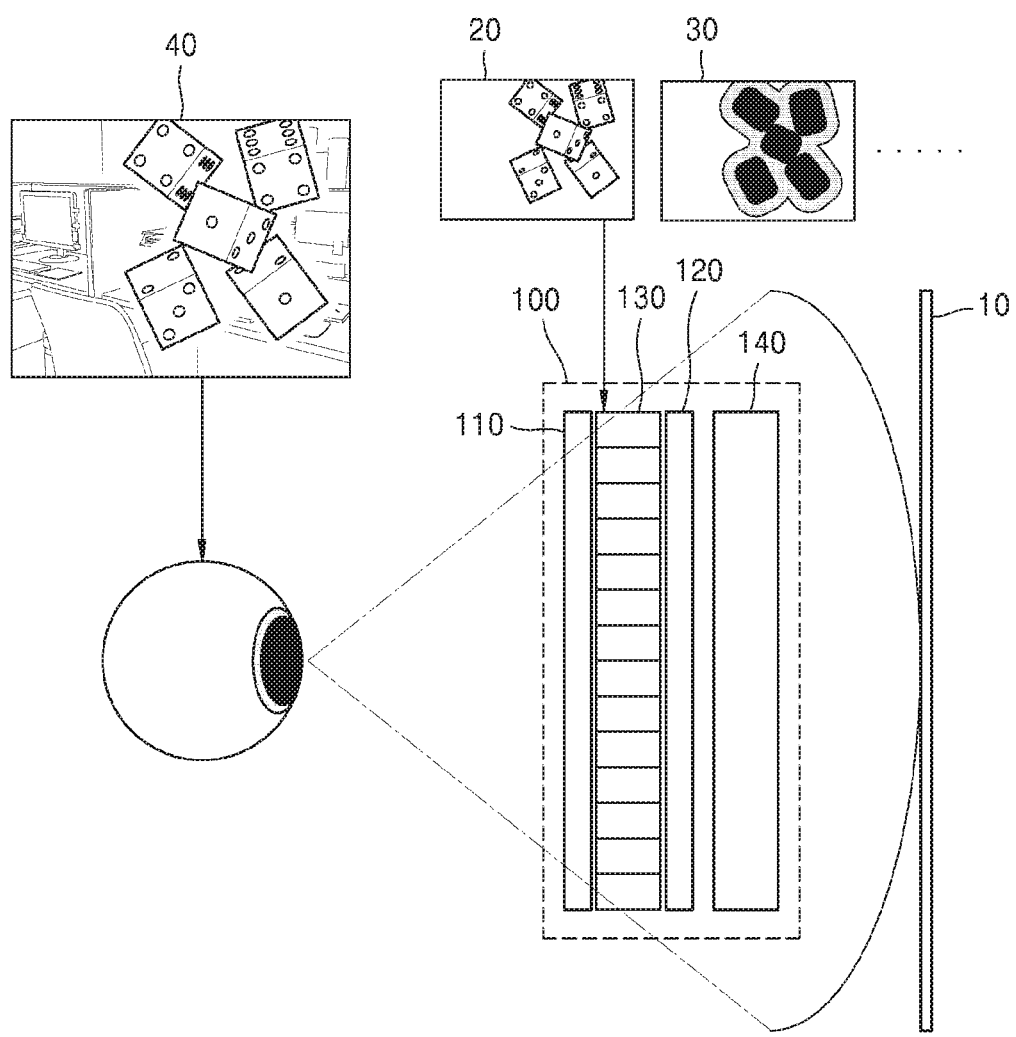
FIG. 1 is a conceptual diagram for describing a device for providing an augmented reality (AR) image, according to an exemplary embodiment.

Reference will now be made in detail to exemplary embodiments, specific examples of which are illustrated in the accompanying drawings in which like reference numerals refer to like elements throughout. In this regard, exemplary embodiments may be diversely modified, have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Terms used herein will be briefly described, and aspects of exemplary embodiments will be described in detail.

Terms used in the present disclosure have been selected as general terms which are widely used at present, in consideration of the functions of exemplary embodiments, but may be altered according to the intent of an operator of ordinary skill in the art, conventional practice, or introduction of new technology. Also, if there is a term which is arbitrarily selected by the applicant, a meaning of the term will be described in detail in a corresponding description portion of the disclosure. Therefore, the terms should be defined on the basis of the entire content of this specification instead of a simple name of each of the terms.

In this disclosure below, when it is described that one comprises (or includes or some elements, it should be understood that it may comprise (or include or has) only those elements, or it may comprise (or include or have) other elements as well as those elements if there is no specific limitation. Moreover, each of terms such as " . . . unit", " . . . apparatus" and "module" described in specification denotes an element for performing at least one function or operation, and may be implemented in hardware, software or the combination of hardware and software.

Hereinafter, exemplary embodiments will be described in detail with reference to the accompanying drawings. The exemplary embodiments may, however, be embodied in many different forms and should not be construed as being limited to the exemplary embodiments set forth herein. In the accompanying drawings, well known features may be omitted for clarity. Moreover, like reference numerals refer to like elements throughout.

FIG. 1 is a conceptual diagram for describing a device 100 for providing an augmented reality (AR) image 40, according to an exemplary embodiment.

The device 100 according to an exemplary embodiment may include a display 130, including a surface on which a first polarizer 110 is attached and another surface on which a second polarizer 120 is attached, and a polarization switch 140. However, this is merely an exemplary embodiment, and the device 100 may further include a processor for controlling the first polarizer 110, the second polarizer 120, the display 130, and the polarization switch 140.

The first polarizer 110 and the second polarizer 120 may transmit polarized lights having different axial directions. For example, the first polarizer 110 may transmit polarized light in an X-axis direction, and the second polarizer 110 may transmit polarized light in a Y-axis direction.

Moreover, the display 130 may display at least one image. For example, the display 130 may display a first image 20 including an object and a second image 30 including a mask for blocking transmission of light through a positon corresponding to a position of the object of the first image 20.

The display 130 according to an exemplary embodiment may alternately display the first image 20 and the second image 30 to provide a user of the device 100 with the AR image 40 where a real-world scene 10 and an object are seen to overlap each other. For example, if an object is a plurality of dices, the device 100 may provide the AR image 40 where the dices are seen to overlap the real-world scene 10 which the user is looking at. Here, the device 100 may block light of an area overlapping the object by using a mask in order for the light of the area overlapping the object not to be transmitted in the real-world scene 10.

In order for the device 100 to provide the user with the AR image 40 which is more realistic, external light incident on the device 100 may be controlled in order for real-world light not to be transmitted through the first image 20 including the object. In the device 100 according to an exemplary embodiment, the polarization switch 140 may be arranged in one direction of the display 130, for controlling the external light incident thereon.

The polarization switch 140 may adjust an angle of a polarization surface to change a direction of polarized light incident on the display 130. For example, when the display 130 displays the first image 20 including the object, the polarization switch 140 may determine the direction of the polarized light, which is incident on the display 130, as the X-axis direction vertically intersecting the Y-axis direction of the second polarizer 120 attached on the display 130. Polarized light in the X-axis direction may be blocked by the second polarizer 120, and the polarized light in the X-axis direction may not be irradiated onto the display 130. Accordingly, the user of the device 100 may view the first image 20 including the object to which the real-world light is not added.

According to another exemplary embodiment, when the display 130 displays the second image 30 including the mask, the polarization switch 140 may determine the direction of the polarized light, which is incident on the display 130, as a direction which is the same as the Y-axis direction of the second polarizer 120 attached on the display 130. Polarized light in the Y-axis direction may be irradiated onto the display 130 through the second polarizer 120. Here, the polarized light in the Y-axis direction may be blocked for an area occluded by the mask. As the polarized light in the Y-axis direction is irradiated onto the display 130, the user of the device 100 may view a real-world scene except a mask area.

When the second image 30 is displayed on the display 130, a focus does not match, and for this reason, a blur effect where the mask of the second image 30 is dimly seen. The device 100 according to an exemplary embodiment may predict a blur value representing a degree to which the blur effect occurs in the second image 30 and may perform preprocessing for offsetting the blur effect, on the second image 30. The display 130 may alternately display the second image 30, which has been corrected through the preprocessing, and the first image 20, thereby providing the user with the AR image 40.

The device 100 according to an exemplary embodiment may be implemented as various types. For example, in the present specification, the device 100 may be a smart glass, a head-mounted display, or the like. However, this is merely an exemplary embodiment, and the device 100 is not limited thereto.

Figure 2:
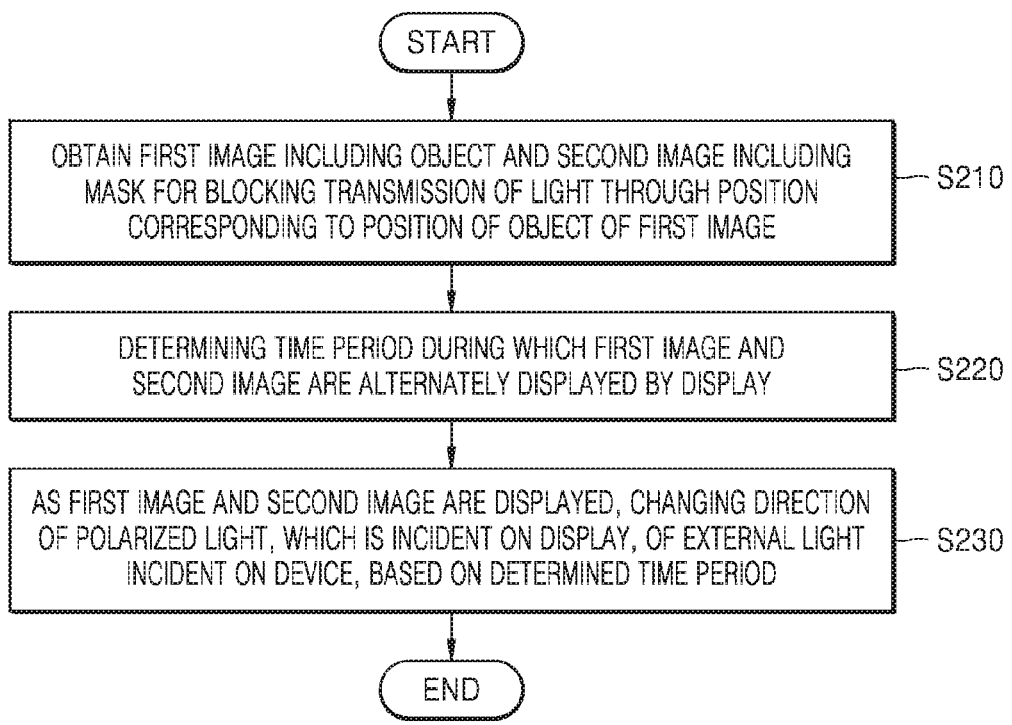
FIG. 2 is a flowchart of a method of providing, by a device according to an exemplary embodiment, an AR image.

FIG. 2 is a flowchart of a method of providing, by a device according to an exemplary embodiment, an AR image.

In operation S210, a device may obtain a first image including an object and a second image including a mask which blocks transmission of light through a position corresponding to a position of the object of the first image.

The device according to an exemplary embodiment may obtain the first image including the object and the second image including the mask, for providing an AR image where the object and a real-world scene are combined with each other. Here, the mask included in the second image may block real-world light incident on a position of the mask in order for an area overlapping the object not to be seen on the real-world scene.

In order to increase an immersion of a user in an AR image, the device may sense an eye-gaze of the user wearing the device to determine a position of the object in the first image. For example, when the eye-gaze of the user looks at a left upper end, the device may arrange the object in a left upper end area of the first image. However, this is merely an exemplary embodiment, and the position of the object is not determined based on only the eye-gaze of the user.

In operation S220, the device may determine a time period during which the first image and the second image are alternately displayed by a display.

The device according to an exemplary embodiment may provide an AR image through time division. For example, the first image and the second image may be alternately displayed during a period of 0.001 sec. The device may alternately display the first image and the second image, thereby providing an effect where the real-world scene and the object appear to be combined.

In operation S230, as the first image and the second image are displayed, the device may change a direction of polarized light incident on the display, the polarized light being of external light incident on the device, based on the determined time period.

When the first image is displayed, the device according to an exemplary embodiment may determine a direction of the polarized light incident on the display in order to prevent at least some of the external light incident on the device from being transmitted through the display. Here, it is assumed that a polarizer having one axial direction and a polarizer having another axial direction are attached on side surfaces of the display.

When the direction of the polarized light incident on the display vertically intersects a direction of a polarizer attached on the display, the polarized light irradiated onto the display may be blocked. For example, when the first image is displayed, the device may change the direction of the polarized light to the one axial direction to block polarized light which is irradiated onto the display through the polarizer having the other axial direction. When the polarized light irradiated onto the display is blocked, at least some of real-world external light is prevented from being added to the object.

According to another exemplary embodiment, when the second image is displayed, the device may change the direction of the polarized light to the other axial direction to cause the polarized light to be irradiated onto the display through the polarizer having the other axial direction. Therefore, the user may sense the real-world scene due to the polarized light irradiated onto the display. Here, since the mask is included in the second image, the user may view an image where an area corresponding to the mask is occluded in the real-world scene.

Since the first image and the second image are alternately displayed, the user of the device may view the AR image where the object is included in the real-world scene.

Figure 3A:
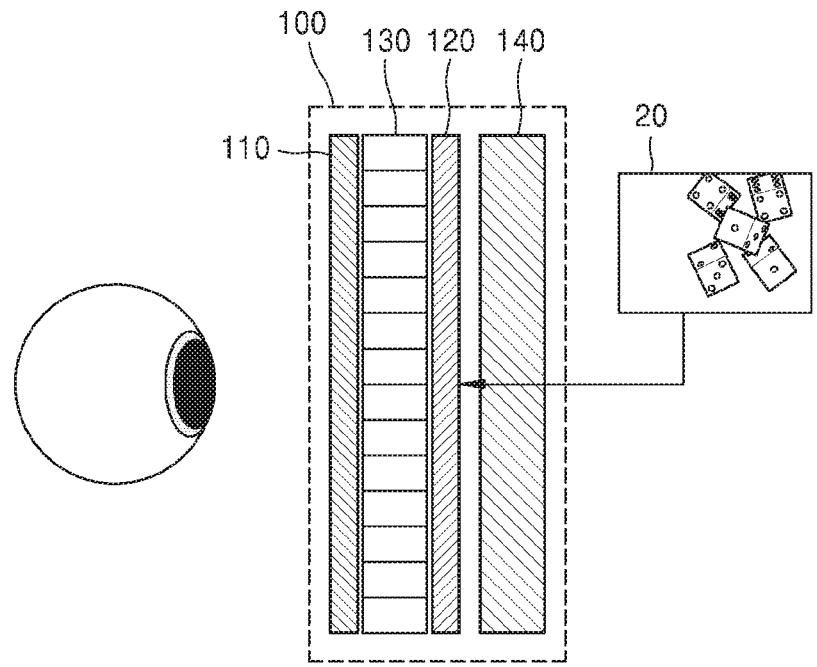
FIGS. 3A and 3B are diagrams for describing a method of changing, by a device according to an exemplary embodiment, a direction of polarized light for providing an AR image.
Figure 3B:
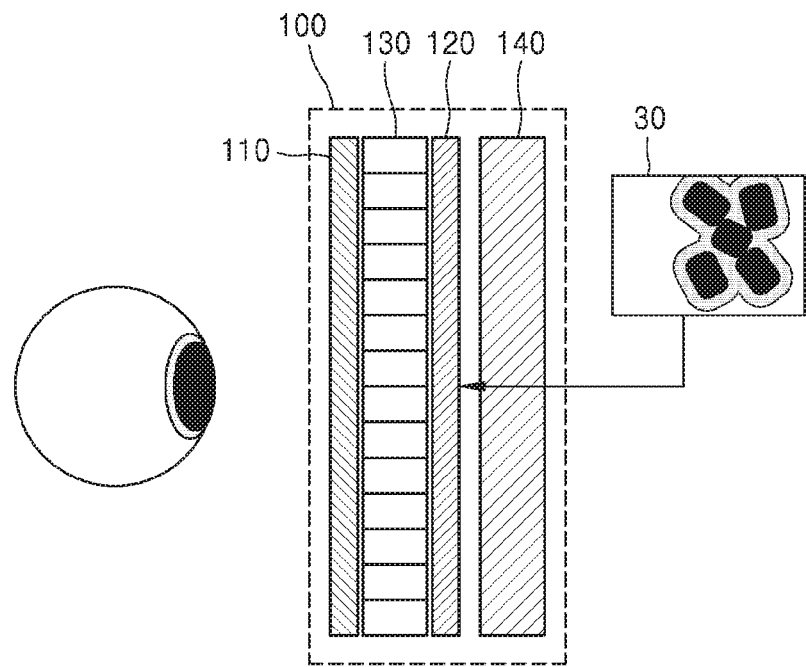

FIGS. 3A and 3B are diagrams for describing a method of changing, by a device 100 according to an exemplary embodiment, a direction of polarized light for providing an AR image.

A first polarizer 110, a second polarizer 120, a display 130, and a polarization switch 140 included in the device 100 in FIGS. 3A and 3B may respectively correspond to the elements of the device 100 described above with reference to FIG. 1.

Moreover, the device 100 may determine a time period where the display 130 displays a first image 120 including an object and a second image 30 including a mask. The device 100 may synchronize a switching period of the polarization switch 140, which changes a direction of polarized light, with the determined time period.

Referring to FIG. 3A, as the display 130 displays the first image 20 including the object, the polarization switch 140 may determine the direction of the polarized light so that polarized light having a direction vertically intersecting that of the second polarizer 120 is incident on the display 130. For example, when a direction of the second polarizer 120 is a Y-axis direction, the polarization switch 140 may determine the direction of the polarized light as an X-axis direction.

Therefore, when polarized light having the X-axis direction is incident on the second polarizer 120, polarized light incident on the display 130 may be blocked. The polarization switch 140 may block the polarized light incident on the display 130, thereby preventing at least some of real-world external light from being added to the object included in the first image 20.

Referring to FIG. 3B, as the display 130 displays the second image 30 including the mask, the polarization switch 140 may determine the direction of the polarized light so that polarized light having a direction corresponding to the second polarizer 120 is incident on the display 130. For example, when the direction of the second polarizer 120 is the Y-axis direction, the polarization switch 140 may determine the direction of the polarized light as the X-axis direction.

Therefore, when the polarized light having the Y-axis direction is incident on the second polarizer 120, the polarized light having the Y-axis direction may be irradiated onto the display 130. Here, the polarized light having the Y-axis direction may be blocked in an area corresponding to the mask included in the second image 30 displayed by the display 130.

Therefore, due to the polarized light which has the Y-axis direction and is transmitted through the display 130, a user of the device 100 may sense a real-world scene where an area corresponding to the object is occluded.

Figure 4:
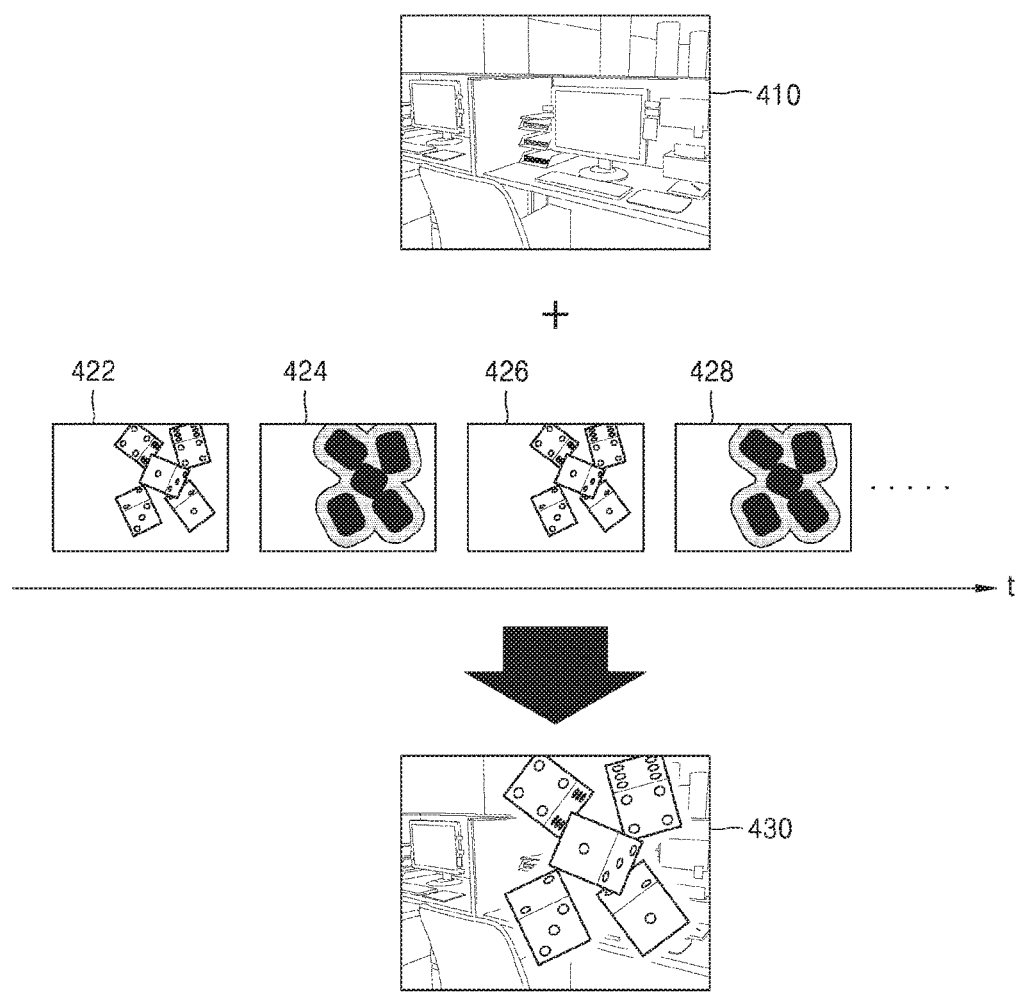
FIG. 4 is a diagram for describing a method of providing, by a device according to an exemplary embodiment, an AR image through time division.

FIG. 4 is a diagram for describing a method of providing, by a device according to an exemplary embodiment, an AR image through time division.

Referring to FIG. 4, the user of the device may sense a real-world scene 410 through a transparent display included in the device. Here, the display may alternately display a first image (for example, 422) including an object and a second image (for example, 424) including a mask on a position corresponding to a position of the object of the first image (for example, 422). For example, the device may repeatedly display a plurality of images 422, 424, 426, and 428 in the order of the first image (for example, 422) and the second image (for example, 424).

The device may alternately display the first image (for example, 422) and the second image (for example, 424) according to time division, thereby providing the user with an AR image 430 where the object and information about the real world are combined with each other.

Figure 5:
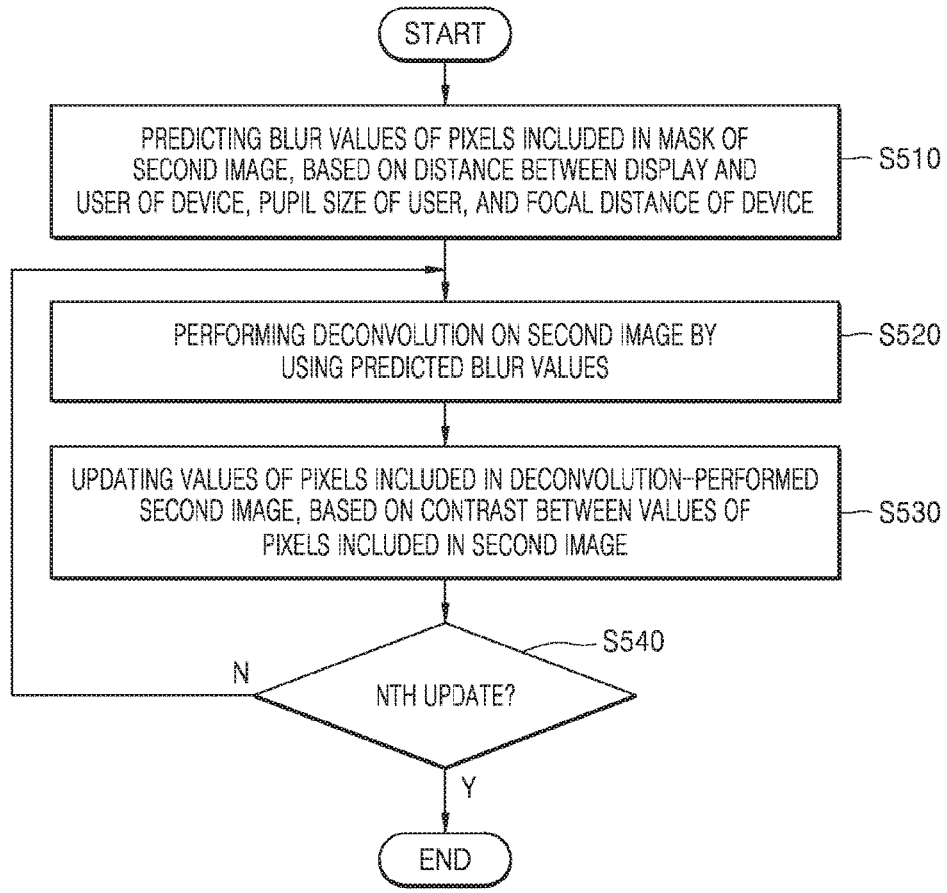
FIG. 5 is a flowchart of a method of correcting, by a device according to an exemplary embodiment, a second image including a mask.

FIG. 5 is a flowchart of a method of correcting, by a device according to an exemplary embodiment, a second image including a mask.

In operation S510, the device may predict blur values of pixels included in the mask of the second image, based on a distance between a display and a user of the device, a pupil size of the user, and a focal distance of the device.

When the device according to an exemplary embodiment displays the second image, the mask included in the second image is not provided on a focal surface, and for this reason, an accurate phase is not formed, causing a blur effect.

The device may predict the blur value of each of the pixels included in the mask of the second image by using a point spread function (PSF) which uses parameters such as the distance between the display and the user of the device, the pupil size of the user, and the focal distance of the device. Here, the second image where a blur phenomenon occurs may be obtained by performing the PSF and convolution on the second image.

In operation S520, the device may perform deconvolution on the second image by using the predicted blur values. For example, the device may perform deconvolution of the PSF on the second image.

In operation S530, the device may update values of pixels included in a deconvolution-performed second image, based on a contrast between the values of the pixels included in the second image.

According to an exemplary embodiment, when the deconvolution is performed on the second image, the contrast between the values of the pixels is lowered. For example, when deconvolution is performed on values of the pixels included in the mask of the second image, a pixel value within a negative number range may be theoretically obtained. However, since it is impossible to realize the pixel value within the negative number range, the pixel value within the negative number range may be changed to a pixel value within a positive number range. For example, the device may change pixel values of pixels, having a value less than −3 to 0 as a result of the deconvolution, to one of pixel values of 0 to 255.

A contrast between the values of the pixels included in the mask of the second image may be lowered in a process where the device performs the deconvolution to change a pixel value, which is changed to a negative number, to a positive pixel value.

The device according to an exemplary embodiment may change the values of the pixels included in the deconvolution-performed second image, so that a contrast between the values of the pixels, included in the deconvolution-performed second image, is approximate to a contrast between the values of the pixels included in the second image.

In operation S540, the device may determine whether the performed update corresponds to an Nth update.

The device according to an exemplary embodiment may repeatedly perform a process of performing deconvolution on the second image and updating an image obtained through the deconvolution. For example, deconvolution may be again performed on the updated second image. The number of repetitions may be previously set in the device. For example, when the previously set number of repetitions is N, the device may determine whether the number of times the second image is updated is "N" times.

When the number of updates is less than "N" times, the device may perform deconvolution on the updated second image. Also, when the number of updates is "N" times, the device may display the updated second image. Here, the updated second image and a first image may be alternately displayed at a predetermined time period.

Figure 6:
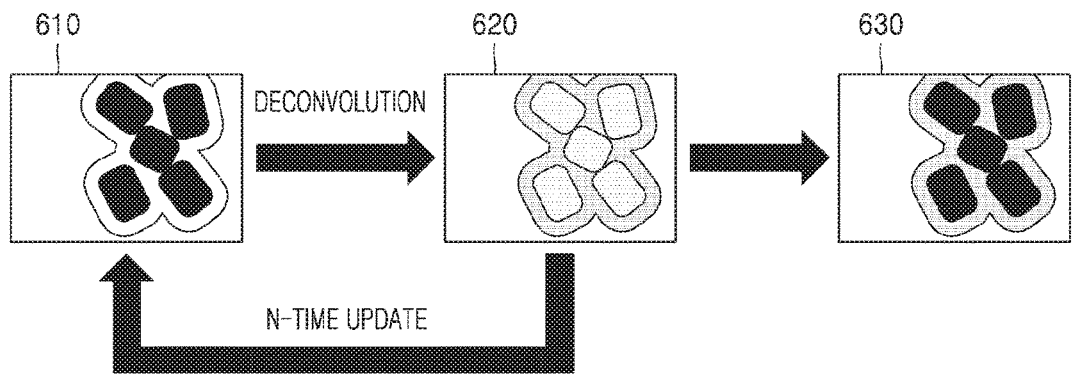
FIG. 6 is a diagram for describing a method of correcting, by a device according to an exemplary embodiment, a second image including a mask.

FIG. 6 is a diagram for describing a method of correcting, by a device according to an exemplary embodiment, a second image including a mask.

Referring to FIG. 6, the device may perform a PSF and deconvolution on a second image 610 including a mask as described above with reference to FIG. 5, thereby obtaining a deconvolution-performed second image 620. Here, as illustrated in FIG. 6, in the deconvolution-performed second image 620, a contrast between values of pixels included in a mask may be lowered.

The device may change values of pixels by using the second image 610 which is an original image, for effectively blocking light of an area corresponding to the mask in a real-world scene. For example, the device may update values of pixels included in the deconvolution-performed second image 620 so that a contrast between the values of pixels included in the deconvolution-performed second image 620 corresponds to a contrast between the values of the pixels included in the mask of the second image 610.

Moreover, the device may perform deconvolution on a second image obtained through the updating to repeatedly perform deconvolution and an update operation. When the number of updates is previously set to "N" times in the device, the device may perform deconvolution and an update operation "N" times, thereby generating a corrected second image 630.

The device according to an exemplary embodiment may alternately display a first image including an object and the corrected second image 630 at a predetermined time period.

Figure 7:
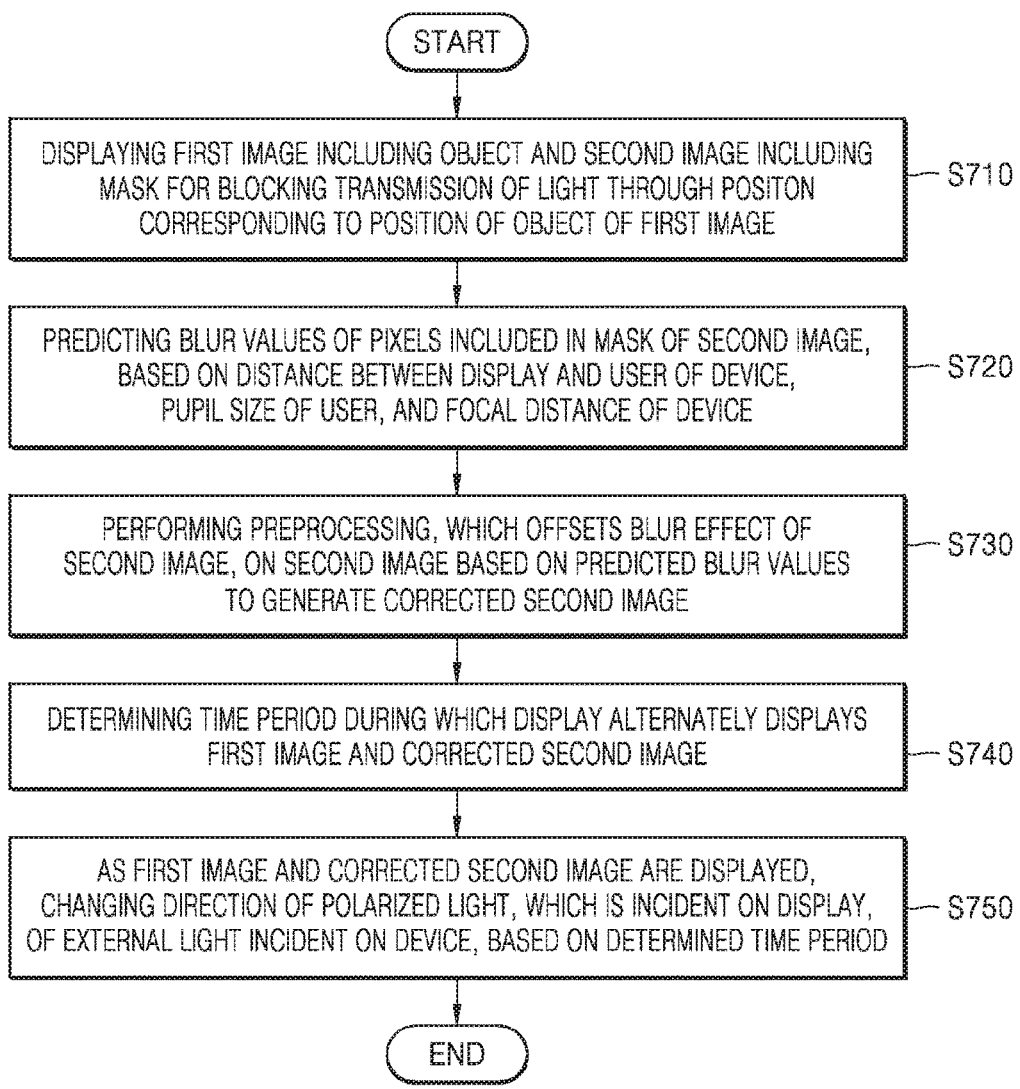
FIG. 7 is a flowchart of a method of providing, by a device according to another exemplary embodiment, an AR image.

FIG. 7 is a flowchart of a method of providing, by a device according to another exemplary embodiment, an AR image.

In operation S710, the device may display a first image including an object and a second image including a mask for blocking transmission of light through a positon corresponding to a position of the object of the first image.

In operation S720, the device may predict blur values of pixels included in the mask of the second image, based on a distance between a display and a user of the device, a pupil size of the user, and a focal distance of the device.

In operation S730, the device may perform preprocessing, which offsets a blur effect of the second image, on the second image based on the predicted blur values to generate a corrected second image.

The device according to an exemplary embodiment may perform deconvolution on the second image by using the predicted blur values and may update values of pixels of a second image obtained through the deconvolution, based on the second image, thereby generating the corrected second image. Here, the deconvolution and an update operation may be repeatedly performed.

In operation S740, the device may determine a time period during which the display alternately displays the first image and the corrected second image.

In operation S750, as the first image and the corrected second image are displayed, the device may change a direction of polarized light, which is incident on the display, of external light incident on the device, based on the determined time period.

Figure 8:
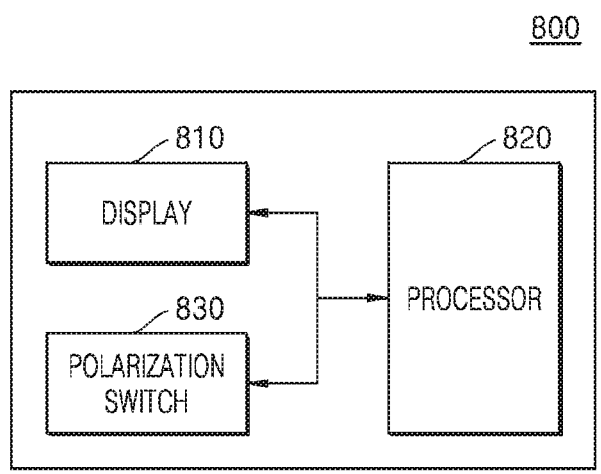
FIGS. 8 and 9 are block diagrams of a device for providing an AR image, according to an exemplary embodiment.
Figure 9:
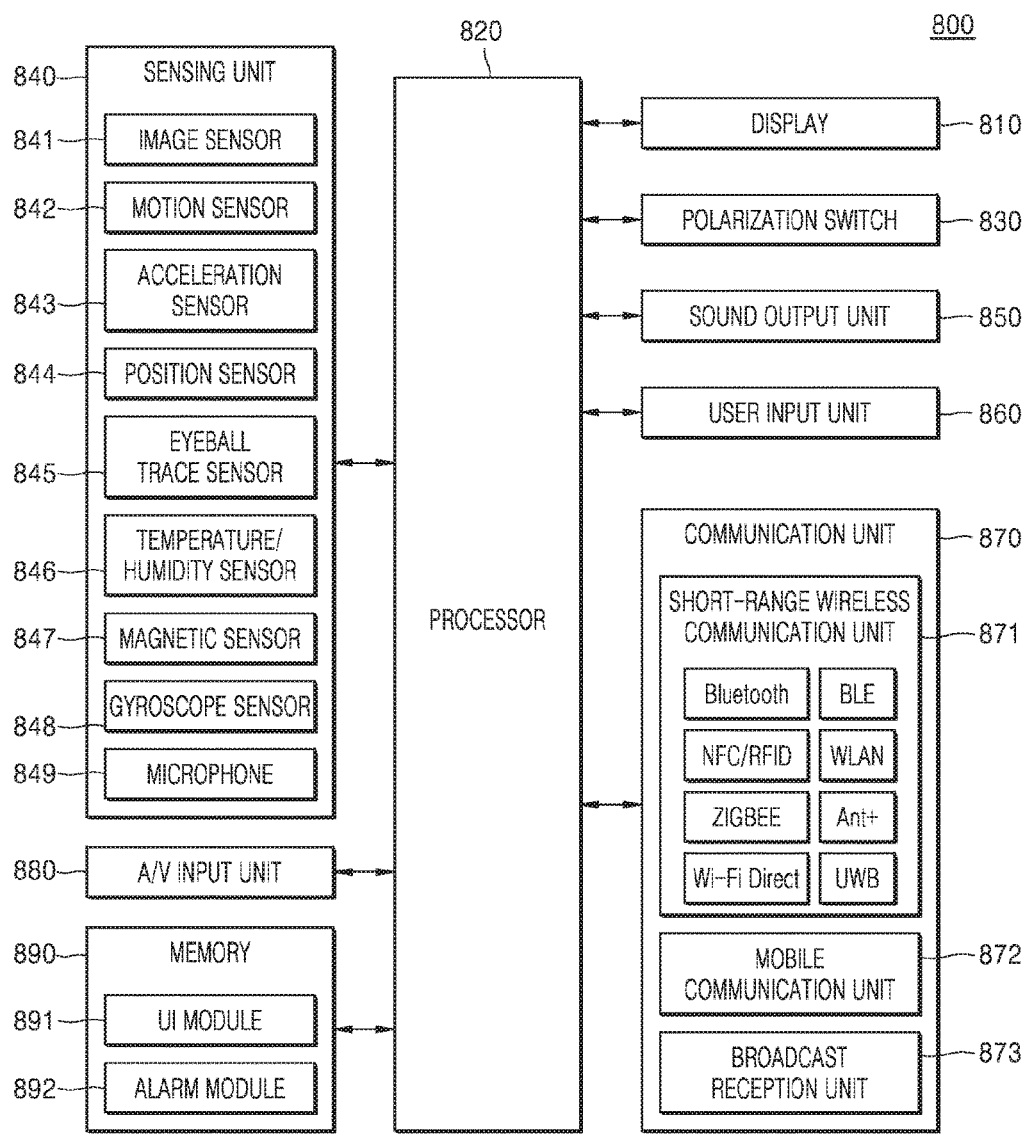

FIGS. 8 and 9 are block diagrams of a device 800 for providing an AR image, according to an exemplary embodiment.

As illustrated in FIG. 8 the device 800 according to an exemplary embodiment may include a display 810, a processor 820, and a polarization switch 830. However, all of the elements are not essential elements. The device 800 may include additional elements, in addition to the illustrated elements. Alternatively, the device 800 may include fewer elements than the number of illustrated elements.

For example, as illustrated in FIG. 9, the device 800 according to an exemplary embodiment may further include a sensing unit 840, a sound output unit 850, a user input unit 860, a communication unit 870, an audio/video (A/V) input unit 880, and a memory 890 in addition to the display 810, the processor 820, and the polarization switch 830.

Hereinafter, the elements will be described in order.

The display 810 may display a first image including an object and a second image including a mask for blocking transmission of light through a positon corresponding to a position of the object of the first image. Here, it is assumed that a polarizer having one axial direction and a polarizer having another axial direction are attached on side surfaces of the display 810.

When the display 810 includes a touch screen in which the display 810 and a touch pad form a layer structure, the display 810 may be used as an input device in addition to an output device. The display 810 may include at least one selected from a liquid crystal display (LCD), a thin film transistor-LCD, an organic light-emitting diode display, a flexible display, a 3D display, and an electrophoretic display. Also, the device 800 may include two or more displays 810 depending on an implementation type of the device 800. In this case, the two or more displays 810 may be arranged to face each other by using a hinge.

The processor 820 may control an overall operation of the device 800. For example, the processor 820 may execute programs stored in the memory 890 to overall control the display 810, the processor 820, the polarization switch 830, the sensing unit 840, the sound output unit 850, the user input unit 860, the communication unit 870, the A/V input unit 880, and the memory 890.

The processor 820 may determine a time period during which the display 810 alternately displays the first image and the second image.

The processor 820 according to an exemplary embodiment may synchronize a switching period of the polarization switch 830, which is arranged in one direction of the display 810 to change a direction of polarized light, with the determined time period during which the display 810 alternately displays the first image and the second image.

The processor 820 according to an exemplary embodiment may predict blur values of pixels included in the mask of the second image, based on a distance between the display 810 and a user of the device 800, a pupil size of the user, and a focal distance of the device 800. Also, the processor 820 may perform preprocessing, which offsets a blur effect of the second image, on the second image based on the predicted blur values to generate a corrected second image. For example, the processor 820 may perform deconvolution on the second image by using the predicted blur values. The processor 820 may update values of pixels of a second image obtained through the deconvolution, based on a contrast between the values of the pixels included in the second image. Here, the deconvolution and an update operation may be repeatedly performed a predetermined number of times.

The processor 820 according to an exemplary embodiment may determine a position of the object of the first image according to an eye-gaze of the user determined by the sensing unit 840.

The polarization switch 830 may change a direction of polarized light, which is incident on the display 810, of external light incident on the device 800, based on the determined time period. For example, when the first image is displayed, the polarization switch 830 may determine polarized light, which is incident on the display 810, of incident external light as first polarized light having one axial direction, and when the second image is displayed, the polarization switch 830 may determine polarized light, which is incident on the display 810, of the incident external light as second polarized light having another axial direction. Here, transmission of the first polarized light to the display 810 may be blocked by a polarizer which has the other axial direction and is attached on one surface of the display 810, and the second polarized light may be irradiated onto the display 810 through the polarizer having the other axial direction.

The sensing unit 840 may sense at least one of a state of the device 800, a peripheral state of the device 800, and a state of a user wearing the device 800 and may transfer sensed information to the processor 820.

The sensing unit 840 according to an exemplary embodiment may trace an eye-gaze of the user wearing the device 800. For example, the sensing unit 840 may sense a movement of a head region of the user wearing the device 800 to trace the eye-gaze of the user.

The sensing unit 840 may include at least one of an image sensor 841, a motion sensor 842, an acceleration sensor 843, a position sensor 844, an eyeball trace sensor 845, a temperature/humidity sensor 846, a magnetic sensor 847, a gyroscope sensor 848, and a microphone 849, but is not limited thereto. A function of each of the sensors may be intuitively inferred from a name by one of ordinary skill in the art, and thus, its detailed description is not provided.

The sound output unit 850 may output audio data which is received from the communication unit 870 or stored in the memory 890. Also, the sound output unit 850 may output a sound signal associated with a function (for example, a call signal reception sound, a message reception sound, and an alarm sound) performed by the device 800. The sound output unit 850 may include a speaker and a buzzer.

The user input unit 860 denotes a means for inputting data which is used for a user to control the device 800. For example, the user input unit 860 may include a keypad, a dome switch, a touch pad (for example, a contact capacitive type, a press resistive type, an infrared sensing type, a surface ultrasound conductive type, an integration tension measurement type, and a piezo effect type), a jog wheel, and a jog switch, but is not limited thereto.

The user input unit 860 may receive a user input. Also, the user input unit 860 may cooperate with a user interface (UI) module 891 to receive a user input for selecting at least one of items which are displayed on a sensing area of each of the plurality of sensors. However, this is merely an exemplary embodiment, and the kind of the user input received by the user input unit 860 is not limited to the above-described examples.

Moreover, the communication unit 870 may include one or more elements which enable communication between the device 800 and an external device. For example, the communication unit 870 may include a short-range wireless communication unit 871, a mobile communication unit 872, and a broadcast reception unit 873.

The short-range wireless communication unit 871 may include a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direction (WFD) communication unit, an ultra-wideband (UWB) communication unit, or an Ant+ communication unit, but is not limited thereto.

The mobile communication unit 872 transmits or receives a wireless signal to or from at least one selected from a base station, an external terminal, and a server over a mobile communication network. Here, the wireless signal may include various types of data based on transmission or reception of a voice call signal, a video call signal, or a letter/multimedia message.

The broadcast reception unit 873 receives a broadcast signal and/or broadcast-related information from the outside through a broadcast channel. The broadcast channel may include a satellite channel and a terrestrial channel. The device 800 may not include the broadcast reception unit 873 depending on an implementation example.

The A/V input unit 880 receives an audio signal or a video signal. The A/V input unit 880 may obtain a picture frame, such as a still image or a moving image, through an image sensor in a video call mode or a photographing mode or may receive an external sound signal to process the external sound signal to electrical voice data.

The memory 890 may store a program for processing and control by the processor 820 and may store input/output data (for example, pixel values of images).

The memory 890 may include at least one type of storage medium selected from a flash memory type, a hard disk type, a multimedia card micro type, a card type memory (for example, an SD memory or an XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the device 800 may operate a web storage or a cloud server for performing a storage function of the memory 890 on the Internet.

A plurality of programs stored in the memory 1700 may be classified into a plurality of modules depending on their functions, and for example, may be classified into the UI module 891 and an alarm module 892.

The UI module 891 may provide a specialized UI and graphic UI (GUI), which cooperate with the device 800, for each application.

The alarm module 892 may generate a signal for notifying an event which occurs in the device 800. Examples of the event which occurs in the device 800 may include an input of a key signal and/or the like. The alarm module 892 may output a notice signal in a video signal type through the display 810 and may output a notice signal in an audio signal type through the sound output unit 850.

The method according to the exemplary embodiments may be implemented as computer-readable codes in a computer readable medium. The computer-readable recording medium may include a program instruction, a local data file, a local data structure, or a combination thereof. The computer-readable recording medium may be specific to exemplary embodiments or commonly known to those of ordinary skill in computer software. The computer-readable recording medium includes all types of recordable media in which computer readable data are stored. Examples of the computer-readable recording medium include a magnetic medium, such as a hard disk, a floppy disk and a magnetic tape, an optical medium, such as a CD-ROM and a DVD, a magneto-optical medium, such as a floptical disk, and a hardware memory, such as a ROM, a RAM and a flash memory, specifically configured to store and execute program instructions. Furthermore, the computer readable recording medium may be implemented in the form of a transmission medium, such as light, wire or waveguide, to transmit signals which designate program instructions, local data structures and the like. Examples of the program instruction include machine code, which is generated by a compiler, and a high level language, which is executed by a computer using an interpreter and so on.

Reference numerals are used in the exemplary embodiments shown in the drawings, and specific terms are used to explain the exemplary embodiments; however, they are not intended to limit the exemplary embodiments and may represent all the components that could be considered by those of ordinary skill in the art.

The exemplary embodiments may be embodied as functional blocks and various processing operations. The functional blocks may be implemented with various hardware and/or software configurations executing specific functions. For example, the exemplary embodiments employs integrated circuit configurations such as a memory, processing, logic, a look-up table and the like capable of executing various functions upon control of microprocessors or other control devices. In a similar manner to that in which the elements of the present disclosure may be executed with software programming or software elements, the exemplary embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, exemplary embodiments may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Specific executions described herein are merely examples and do not limit the scope of the present disclosure in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections. Also, the described elements may not be required elements for the application of the present disclosure unless they are specifically mentioned as being "essential" or "critical."

The singular forms "a," "an" and "the" in this present disclosure, in particular, claims, may be intended to include the plural forms as well. Unless otherwise defined, the ranges defined herein is intended to include values within the range as individually applied and may be considered to be the same as individual values constituting the range in the detailed description. Finally, operations constituting methods may be performed in appropriate order unless explicitly described in terms of order or described to the contrary. Exemplary embodiments are not necessarily limited to the order of operations given in the description. The examples or exemplary terms (for example, etc.) used herein are to merely describe exemplary embodiments in detail are not intended to limit the present disclosure unless defined by the following claims. Also, those of ordinary skill in the art will readily appreciate that many alternations, combinations and modifications, may be made according to design conditions and factors within the scope of the appended claims and their equivalents.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more embodiments have been described with reference to the figures, it will be understood by those of ordinary skill in the art that various changes in form and details may be made therein without departing from the spirit and scope as defined by the following claims.

What is claimed is:

1. A device for providing an augmented reality (AR) image, the device comprising:
    a display configured to alternately display a first image including an object at an object position and a second image including a mask for blocking transmission of light incident on the display at the object position;
    a processor configured to determine a time period and control the display to alternately display the first image and the second image during the time period, predict blur values of pixels corresponding to the mask of the second image based on at least one of a distance between the display and a user of the device, a pupil size of the user, and a focal distance of the device, perform preprocessing on the second image to offset a blur effect and generate a corrected second image based on the predicted blur values; and
    a polarization switch configured to alternately polarize the light incident on the display at a switching period determined based on the time period.

2. The device of claim 1, wherein the processor is further configured to synchronize the switching period of the polarization switch arranged in one direction of the display to change the direction of the polarized light, with the determined time period.

3. The device of claim 1, wherein the polarization switch is further configured to change the polarization direction to a first axial direction while the first image is displayed, and change the polarization direction to a second axial direction while the second image is displayed.

4. The device of claim 1, wherein the processor is further configured to perform deconvolution on the second image by using the predicted blur values and update values of pixels of a second image obtained through the deconvolution based on a contrast between the values of the pixels included in the second image.

5. The device of claim 4, wherein the processor is further configured to perform the deconvolution on a second image obtained through the updating by using the predicted blur values, and
    the deconvolution and the updating are repeatedly performed a predetermined number of times.

6. The device of claim 1, further comprising: a sensor configured to sense an eye-gaze of a user of the device,
    wherein the processor is further configured to determine the object position of the object of the first image based on the sensed eye-gaze.

7. A method of providing, by a device, an augmented reality (AR) image, the method comprising:
    obtaining a first image including an object at an object position and a second image including a mask for blocking transmission of light incident on a display of the device at the object position;

determining a time period;
predicting blur values of pixels corresponding to the mask of the second image based on a distance between the display and a user of the device, a pupil size of the user, and a focal distance of the device;
performing preprocessing on the second image to offset a blur effect of the second image based on the predicted blur values;
generating a corrected second image based on the predicted blur values; and
controlling a display to alternately display the first image and the corrected second image during the time period,
wherein a polarization switch included in the device is configured to alternately polarize light incident on the display at a switching period determined based on the determined time period.

8. The method of claim 7, further comprising synchronizing the switching period of the polarization switch to change the direction of the polarized light, with the determined time period.

9. The method of claim 7, further comprising:
changing a polarization direction to a first axial direction while the first image is displayed; and
changing a polarization direction to a second axial direction while the second image is displayed,
wherein the light incident on a second polarizer is blocked while the first image is displayed by the second polarizer and the light incident on the second polarizer is irradiated onto the display through the second polarizer while the second image is displayed.

10. The method of claim 7, wherein the generating of the corrected second image comprises:
performing deconvolution on the second image by using the predicted blur values; and
updating values of pixels of a second image obtained through the deconvolution based on a contrast between the values of the pixels included in the second image.

11. The method of claim 10, wherein the generating of the corrected second image comprises performing the deconvolution on a second image obtained through the updating by using the predicted blur values, and
repeatedly performing the deconvolution and the updating a predetermined number of times.

12. The method of claim 7, further comprising sensing an eye-gaze of a user of the device; and
determining the object position of the object of the first image, based on the sensed eye-gaze.

13. A non-transitory computer-readable recording medium storing a program, which when executed by a processor of an augmented reality (AR) device, causes the AR device to perform an AR method, the AR method including:
obtaining a first image including an object at an object position and a second image including a mask for blocking transmission of light incident on a display of the AR device at the object position;
determining a time period;
predicting blur values of pixels corresponding to the mask of the second image based on a distance between the display and a user of the AR device, a pupil size of the user, and a focal distance of the AR device;
performing preprocessing on the second image to offset a blur effect of the second image based on the predicted blur values;
generating a corrected second image based on the predicted blur values; and
controlling a display to alternately display the first image and the corrected second image during the time period,
wherein a polarization switch included in the AR device is configured to alternately polarize light incident on the display at a switching period determined based on the determined time period.

* * * * *